F. E. LAYMAN.
MOLDING MACHINE.
APPLICATION FILED OCT. 2, 1913.
1,150,437.
Patented Aug. 17, 1915.
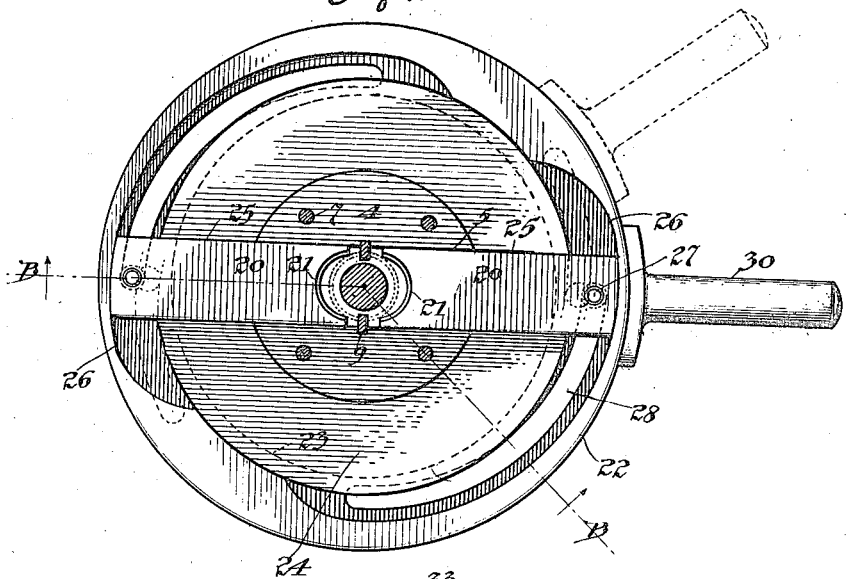
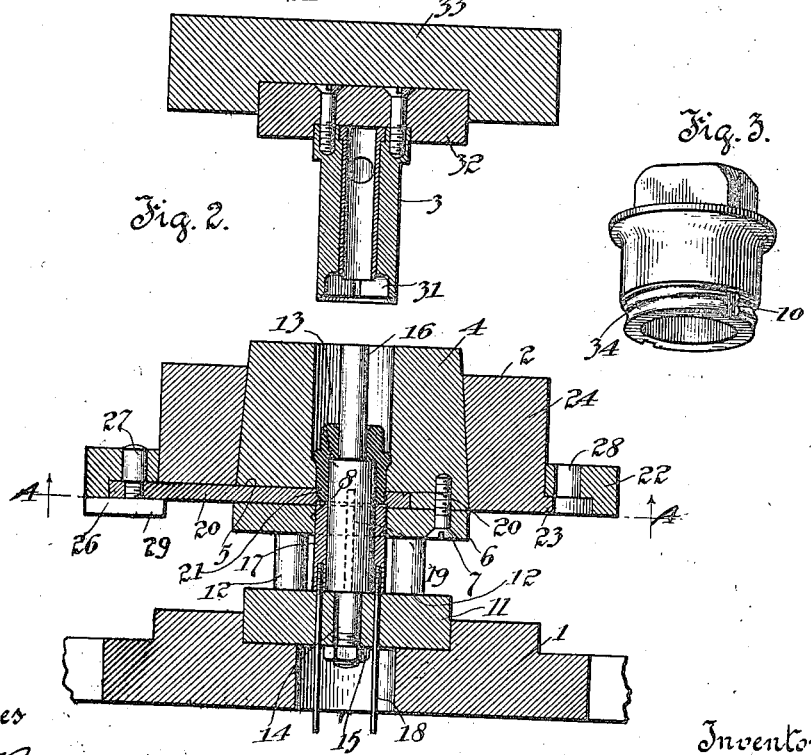
Witnesses
Inventor
Frank E. Layman
by Edwin B. H. Tower Jr.
Attys.

UNITED STATES PATENT OFFICE.

FRANK E. LAYMAN, OF MILWAUKEE, WISCONSIN, ASSIGNOR TO THE CUTLER-HAMMER MFG. CO., OF MILWAUKEE, WISCONSIN, A CORPORATION OF WISCONSIN.

MOLDING-MACHINE.

1,150,437.  Specification of Letters Patent.  Patented Aug. 17, 1915.

Application filed October 2, 1913. Serial No. 793,041.

*To all whom it may concern:*

Be it known that I, FRANK E. LAYMAN, a citizen of the United States, residing at Milwaukee, in the county of Milwaukee and State of Wisconsin, have invented new and useful Improvements in Molding-Machines, of which the following is a full, clear, concise, and exact description, reference being had to the accompanying drawing, forming a part of this specification.

This invention relates to improvements in molding machines.

The improved machine is especially adapted for forming the insulating members of electric attachment plugs from a plastic insulating compound. Such members formed from a plastic composition are generally pressed to shape in a mold by means of a reciprocating plunger. As these plugs are irregular in shape and are generally provided with a screw threaded extremity it has been impossible, with the molds heretofore provided, to withdraw the formed insulator readily from the mold without providing a mold constructed of separable sections. Such a construction of mold is complicated and requires an excessive number of operating parts to properly manipulate the same. Furthermore, the time consumed in forming each insulator in such a machine renders the use of machines of this type undesirable, as the insulators must be turned out in large numbers in a minimum time to keep their cost of manufacture as low as possible.

Although the machine herein described is especially adapted for forming the insulating members of attachment plugs, it is by no means limited to this use but the principles of the invention may be employed in machines for forming many other articles.

An object of the present invention is to provide a molding machine with improved means whereby the molded article may be easily removed from the machine.

Another object of the invention is to provide a molding machine with improved means for reducing the cross section of the article being molded.

Another object of the invention is to provide a machine for molding the insulating members of attachment plugs, having improved means for forming the screw threaded extremities on the insulators.

A preferred embodiment of the invention is illustrated in the accompanying drawings, in which:—

Figure 1 is a horizontal section on the line A—A, Fig. 2, looking upward. Fig. 2 is a vertical section on the broken line B—B, Fig. 1. Fig. 3 is a perspective view of a molded insulator.

The machine comprises a die shoe or bed 1 supporting the mold 2, and a punch or plunger 3 adapted to coöperate with the mold in forming the insulators.

The mold comprises a block or box 4 in the shape of a frustum of a cone. The central portion of the block or box is bored out to form walls of any desired contour for the mold. The lower base of the cone is cut away as at 5 to form three sides of a diametrical slide-way for movable dies hereinafter described. The fourth side of the slide-way is formed by a disk 6 secured to the lower base of the cone, as by screws 7, and provided with a central opening 8. The slide-way is slightly wider than the opening in the mold, so that the jaws of the dies may meet on opposite sides of the opening to completely encircle the insulators. The disk is slotted at diametrically opposite points, the slots extending radially from the edge of the opening, for the reception of rectangular bars 9. These bars are securely held in the disk and extend beyond the upper surface of the disk across the slide-way. The inner edges of the bars project within the mold to form indentations 10 on the insulators (Fig. 3) to provide for locking the metallic shell in place thereon. The mold is supported by a block or die plate 11 on the die shoe or bed 1, by standards or stops 12 rising from the die plate. The die plate 11 also supports a mandrel or center pin 13 which has a reduced end 14 passing through the die plate and held therein by the nut 15, and a reduced upper end 16 extending through the opening in the disk 6 and into the bore of the mold block or box for a purpose hereinafter described. A movable sleeve or pad 17 surrounds the center pin and fills the space between the center pin and the disk to form the bottom of the mold. The sleeve is mounted on a plurality of pins 18 slidable in the die plate 11 so that the sleeve may be moved up on the center pin to eject the insulators from the mold. The sleeve or pad is provided with longitudinal slots 19 on its outer surface which slide on the bars 9.

A pair of dies or slides 20, provided with semi-circular die faces 21, are radially slidable in the slide-ways 5 between the conical block or box 4 and the disk 6. The dies are advanced toward each other to compress the insulator laterally, to reduce its cross-section by means of a cam ring 22. The ring is rotatably supported on a flange 23, formed on the lower edge of an annular die ring 24, the central opening of which is tapered to fit over the conical block or box 4. The die ring 24 is provided with a slide-way 25, forming an extension at either end of the slide-way 5 in the block or box 4. The cam ring is cut away along its inner edge to form cam surfaces 26 diametrically opposite each other, which coöperate with the ends of the dies or slides to advance the dies or slides toward each other as the cam ring is rotated. The outer ends of the slides are held to the cam ring by bolts 27, which extend downwardly through eccentric slots 28 in the cam ring, into clamping plates 29. A handle 30 is provided for turning the cam ring 22.

The punch or press comprises a plunger 31 secured to a punch plate 32, carried by a punch holder 33. The lower end of the plunger is enlarged to fill the bore of the mold and is given any desired contour to impart the proper shape to the top of the insulators. The plunger is centrally bored to receive the reduced end of the mandrel or center pin, so that an opening for leading the conductors into the insulators may be provided in the top thereof.

To form an insulating member for attachment plugs such as illustrated in Fig. 3, a sufficient quantity of plastic composition is placed in the mold while the plunger is raised and the sleeve or pad 17 is in its lowermost position, as indicated in Fig. 2. The dies may be projected into the mold as illustrated in dotted lines in Fig. 1, and in full lines in Fig. 2, by rotating the handle to its dotted line position, Fig. 1. Where it is desired to form screw threads on the reduced portion of the insulators, the die faces are corrugated or given the desired contour to form the portion 34, Fig. 3. The plunger or punch is advanced and compresses the material in the mold, giving the proper shape to the external surface and causing the mandrel or center pin to shape the interior surface. It is apparent that aside from the projections on the dies, there are no portions of the device which can interfere with ejecting the molded article from the machine as soon as the plunger is retracted. Therefore, by rotating the handle 30 back to the position indicated in full lines in Fig. 2, the eccentric slots 28 and the bolts 27 will retract the dies or slides and leave the completed article free to be ejected by raising the sleeve or pad 17 by means of the pins 18.

It is apparent that this invention provides a simple and compact molding machine having a minimum number of operating parts which will accurately and rapidly mold insulators of any desired shape, and from which the insulators may be readily removed without the necessity of forming the mold of separable sections.

Obviously many changes may be made in the proportions and arrangement of parts to adapt the machine to mold articles of various sorts without departing from the invention which is defined in the appended claims.

What I claim as new and desire to secure by Letters Patent of the United States is:—

1. In a machine for molding plastic material, in combination, a mold box having a substantially cylindrical recess and oppositely disposed interior lugs, said mold box having opposed openings through its walls at right angles to said lugs, and a pair of dies reciprocable through said opening to abut said lugs.

2. In a machine for molding plastic material, in combination, a mold box having a substantially cylindrical recess and oppositely disposed interior lugs, said mold box having opposed openings through its walls at right angles to said lugs, and a pair of dies reciprocable through said openings to abut said lugs, said dies having threaded working faces and said lugs having unthreaded working faces whereby the plastic material is molded with a mutilated threaded portion.

3. In a machine for molding plastic material, in combination, a mold box having a substantially cylindrical recess and a plurality of interiorly projecting lugs, said mold box having openings through its walls spaced from said lugs, a substantially cylindrical mandrel projecting within said mold box recess, a pair of dies reciprocable through said wall openings to approach said mandrel and abut said lugs, and a sleeve about said mandrel and movable thereon to eject the molded material, said sleeve having recesses interfitting with said lugs and being guided in its movement thereby.

In witness whereof, I have hereunto subscribed my name in the presence of two witnesses.

FRANK E. LAYMAN.

Witnesses:
EDWARD KARL,
RAYMOND H. VAN NEST.